United States Patent Office 3,741,946
Patented June 26, 1973

3,741,946
EMULSION COPOLYMERIZATION OF ISOBUTYL-VINYL ETHER AND VINYL CHLORIDE
Wiley E. Daniels, Easton, Pa., assignor to GAF Corporation, New York, N.Y.
No Drawing. Continuation of application Ser. No. 594,651, Nov. 16, 1966. This application Aug. 7, 1970, Ser. No. 62,134
Int. Cl. C08f 1/60
U.S. Cl. 260—87.5 G         7 Claims

ABSTRACT OF THE DISCLOSURE

A process for preparing copolymers of isobutylvinyl ether and vinyl chloride having an $\eta_{rel}$ (1% weight/volume in toluene) of 1.3 to 1.5, a volume strength of 3,000 to 5,000 p.s.i.g., and an elongation of 3.5 to 7%, which consists of copolymerizing isobutylvinyl ether and a portion of the vinyl chloride to be polymerized in an aqueous phase containing a high purity sodium alkyl sulfate and potassium persulfate so as to yield a 40–50% conversion followed by equal incremental additions of the remaining portions of the vinyl chloride to be copolymerized for a period of time until constant pressure is obtained, and subsequently isolating the resultant copolymer by coagulation with a primary aliphatic alcohol or a water-soluble salt of a potassium cation.

---

This application is a continuation of Ser. No. 594,651 filed Nov. 16, 1966 and now abandoned.

This invention relates to an improved process of copolymerizing iso-butylvinyl ether and vinyl chloride by the emulsion technique to a high molecular weight copolymer which has improved film strength characteristics and other improved properties.

The emulsion copolymerization of iso-butylvinyl ether and vinyl chloride is well known in the polymer art. The details of the manufacture of such copolymers have been reported by C. E. Schildknecht in his book "Vinyl and Related Polymers," pp. 408, 409, published by John Wiley & Sons, Inc., New York (1952); and in P. B. Report 485, p. 62; J. G. Kern (1945). These publications report that the emulsion copolymerization of iso-butylvinyl ether and vinyl chloride (30/70 weight ratio) was conducted at a temperature of 30–50° C. The aqueous phase contained 6% of surfactant (Mersolat, a sodium alkyl sulfonate) 0.1 to 0.3% of potassium persulfate and a phosphate buffer to maintain the pH near 7.0. The aqueous/monomer ratio was 75/25. The vinyl chloride was added portionwise to the reacting iso-butylvinyl ether monomer. Conversions were apparently less than 100%, since unreacted monomer was present which was not recovered. A later reference, M. F. Shostakovskii et al., Jhurnal, prik. Khim. 28, (1955) 1123–1127, disclosed a maximum conversion of monomers to polymer of 80.5% after 48 hours at 30° C. in an autoclave. Again, a sodium alkyl sulfonate was used as surfactant.

The copolymer prepared as described in the foregoing references has been suggested for use in the surface coating industry because of its solubility in a variety of organic solvents. The molecular weight of the copolymer is such that a 1.0 weight/volume percent solution in toluene has an $\eta_{rel}$ of 1.289. A 10 mil film prepared from the copolymer by Carver pressing has a tensile strength of 1200 p.s.i.g. and an elongation of only 1.8 percent and is very brittle. Such copolymer would find greater favor in the surface coating industry if the films thereof had improved film strength properties, which impart durability to dried lacquer and paint films.

It is the principal object of the present invention to provide an improved process for emulsion copolymerization of isobutylvinyl ether and vinyl chloride to a higher molecular weight and of higher film elongation and of higher film strength.

Other objects and advantages will become manifest from the following description.

In attaining the foregoing objects, the emulsion copolymerization is carried out at temperatures of 30°–40° C., the vinyl chloride being added to the iso-butylvinyl ether/vinyl chloride mixture in a programmed manner, as will be evident from the following general process details and illustrative working examples. A very high level of surfactant purity is an absolute necessity in carrying out the copolymerization reaction, such as sodium alkyl sulfate, wherein the alkyl is from 8 to 16 carbon atoms and of 95 to 99.5 percent assay. The product of the copolymerization is then isolated from the latex by means of coagulation while employing potassium salts such as potassium chloride, potassium acetate and potassium sulfate, etc., so as to provide a copolymer of high purity containing very small amounts of non-polymeric solids as determined by the ash content. Instead of potassium salts, a primary aliphatic alcohol of from 1 to 4 carbon atoms may be employed as the coagulating medium in the ratio of 1 part by volume of latex to 2 parts by volume of said alcohol to yield a copolymer of high purity.

In general, the improved process comprises copolymerizing iso-butylvinyl ether and vinyl chloride (30/70 total ratio) to higher molecular weight copolymers having higher film elongation and higher film strength by the reaction of the following components in a sealed pressure vessel such as an autoclave at 30°–40° C.

The parts given are by weight unless otherwise noted. 30 parts of iso-butylvinyl ether and 30 parts of vinyl chloride are added together at 30°–40° C. into an aqueous phase consisting of 300 parts of water, 12 parts of sodium alkyl sulfate, such as sodium octyl sulfate, sodium nonyl sulfate, sodium decyl sulfate, sodium lauryl sulfate, sodium tridecyl sulfate, sodium pentadecyl sulfate, and sodium cetyl sulfate of 95–99.5% assay, 3.8 parts of anhydrous monobasic sodium phosphate ($NaH_2PO_4$), 2.4 parts of 50% aqueous sodium hydroxide solution to give a pH of 7.5–12, and 0.9 part of potassium persulfate for a period of time of 4–5 hours or until 40–50% conversion has occurred (as determined by solids content), followed by the addition of 40 parts of vinyl chloride in 4 equal increments, and allowing each increment to react at 30°–40° C. for a period of up to two hours, followed by continuing the reaction until a low constant pressure value of about 0 to 4 p.s.i.g. is obtained.

The resultant latex is coagulated most efficiently by adding the latex to a lower alcohol of 1 to 4 carbon atoms or to a solution of a potassium salt in water so that the volume of water will be ca. five times the volume of latex and that the weight of potassium salt contained therein will be about one-fifth the weight of latex. The coagulated polymer is then washed with stirring in an amount of water equal to 10 times the original latex volume while heating to 65 to 70° C., and filtering quickly at that temperature. The isolated copolymer is then vacuum dried to constant weight to yield 90–95% recovery of copolymer from the original latex. The resulting copolymer contains low quantities of non-polymeric solids, e.g. ca. 0.01–0.04% dry ash, and is composed of from 70 to 75% vinyl chloride, but most commonly about 71–73% vinyl chloride, and has an $\eta_{rel}$ in toluene (1.0 w./v. percent) of 1.3 to 1.5, mostly a value of about 1.4.

It is also possible to carry this copolymerization out at 29% solids or at 40 or at 51% solids concentration as will be shown in the detailed illustrative examples. When working at 50% solids, the pH must be raised to a value of about 12, and slightly more potassium persulfate must be used, as will be noted from Examples V and VI.

The following table shows the comparison between the new and improved features of the copolymerization process and the resulting copolymer of the present invention and the process of the prior art described by C. E. Schildknecht, referred to above:

| Detail | Prior art | Instant process |
| --- | --- | --- |
| Temperature | 30° to 50° C | 30° to 40° C. |
| Surfactant type | Alkylarylsulfonate | Sodium alkylsulfate 95 to 99.5%. |
| Surfactant concentration | 6% in aq. phase | 3.5% to 4.5% in aq. phase. |
| pH | Near 7 | 7 to 12. |
| Reaction time | Undisclosed | 24 to 30 hours. |
| Manner of monomer addition | Incremental | Incremental. |
| Conversion | Less than 100% | 98 to 100%. |
| Ratio monomer to aqueous phase | 1:3 | From 1:3 to 1:1. |
| Copolymer isolated by | $Al_2(SO_4)_3$ coagulation | Lower alcohol or potassium salt coagulation. |
| Copolymer $\eta_{rel}$ (1% toluene) | 1.289 | 1.3 to 1.5. |
| Copolymer film strength | 1,200 p.s.i.g | 3,000 to 5,700 p.s.i.g. |
| Copolymer film elongation | 1.8% | 3.5 to 7.0%. |
| Copolymer dry ash content | 0.26 to 0.62 | 0.01 to 0.05. |

The following examples will specifically illustrate how the foregoing objects are attained. The parts given are by weight unless otherwise noted.

EXAMPLE I

The following aqueous phase was prepared:

300.0 grams of $H_2O$
3.8 grams of $KH_2PO_4$
2.4 ml. of 50% NaOH solution (pH 7.5)
12.0 grams of sodium lauryl sulfate 99.5% assay, and
0.9 gram of potassium persulfate.

This was placed in a 1.0 liter magnetically stirred autoclave which was sealed and pressure tested. The autoclave was evacuated to 1 mm. of Hg, then filled with $N_2$ to 1 atm. (0 p.s.i.g.). This was repeated three times, and the temperature raised to 30° C., and maintained there electronically.

There was then added to the autoclave from a stainless steel transfer cylinder, a mixture consisting of 30.0 grams of iso-butylvinyl ether and 30.0 grams of vinyl chloride and allowed to react for 4¾ hours at 30° C., during which time the internal pressure remained at 36 p.s.i.g. At the end of this time 10.0 grams of vinyl chloride were added and allowed to react for two hours at 30° C., pressure fell from 46 to 24 p.s.i.g. Another 10.0 grams of vinyl chloride were added, reacted for two hours at 30° C., pressure fell from 41 to 10 p.s.i.g. A third 10.0 gram increment of vinyl chloride was added and reacted 2 hours at 30° C., pressure fell from 40 to 10 p.s.i.g. The fourth increment of 10.0 grams of vinyl chloride was added and allowed to react to a constant pressure value of 4 p.s.i.g. at a total reaction time of 18 hours. The product was a thin fluid copolymer latex of 28.0% solids (29.0% theoretical) (96.5% conversion) and pH 7.0.

A sample of polymer was obtained by coagulation with methanol, and repeatedly washed with water, and dried to constant weight. The copolymer on elemental analysis contained 48.9% C, 6.7% H, 41.8% Cl, 0.34% ash (calculated for a 30/70 iso-butyl vinyl ether/vinyl chloride copolymer was 39.8% Cl) or ca. 73.2% PVC, 27.8% iso-butyl vinyl ether. The $\eta_{rel}$ of a 1.0 w./v. percent toluene solution was 1.36. The copolymer had a Parr melting range of 92–107° C. and was Carver pressed into a 10 mil film having a tensile strength of 3300 p.s.i.g. and an elongation of 4.2% as determined by an Instron tensile test.

EXAMPLE II

This example illustrates a twenty-fold scale-up of the polymerization process of Example I, and the isolation of the copolymer by means of KCl coagulation.

The 5-gallon autoclave was thoroughly cleaned and conditioned prior to polymerization by boiling up to 70 grams of potassium persulfate per 3 gallons distilled water for 1 hour, followed by a rinse with distilled water.

The following mixtures were then prepared:

Phase A (prepared in 22 liter flask)

72 grams of $KH_2PO_4$ was dissolved in 6000 grams of distilled water (pH 4.5–4.7). Then 25 cc. of 50% NaOH was added (pH 7.5–8.0). To this was added 240 grams of sodium lauryl sulfate 99.5% assay. This mixture was then stirred for several hours. To the mixture was added 18 grams of potassium persulfate and agitated for 15 minutes.

Phase B (prepared in a steel pressure cylinder)

600 grams of vinyl chloride was evaporated from the main cylinder through a KOH packed tube (to remove phenol stabilizer) and condensed into a cylinder containing 600 grams of isobutyl vinyl ether (assay by VPC 99.9%). Phase A was charged into the 5-gallon autoclave. The autoclave was then purged of air by pulling a vacuum to about 50 mm. Hg and releasing with nitrogen. This was repeated three more times. The contents were then heated to 30° C. Phase B was then charged and the reaction allowed to proceed for 4¾ hours. During this period the pressure dropped from 30 to 27 p.s.i.g. and the temperature held constant at 30° C. After the 4¾ hours a sample was taken and indicated 8.4% solids or 40.3% conversion.

At this time 200 grams of vinyl chloride was added and the reaction continued at 30° C. for 2 more hours. A sample after the two hours indicated 14.0% solids or 63.1% conversion. Pressure dropped from 44 to 24 p.s.i.g. At this time 200 grams of vinyl chloride was added and the reaction continued at 30° C. for 2 more hours. A sample after the two hours indicated 22.2% solids or 90.6% conversion. Pressure dropped from 44 to 4 p.s.i.g. At this time 200 grams of vinyl chloride was added and the reaction continued at 30° C. for 2 more hours. A sample after the two hours indicated 23.8% solids or 90.1% conversion. Pressure dropped from 40 to 0 p.s.i.g. At this time 200 grams of vinyl chloride was added and the reaction continued at 30° C. for 2 more hours. A sample after the two hours indicated 26.8% solids or 95.0% conversion. The reaction was continued at 30° C. for an additional 1 hour until the pressure had dropped to 0 p.s.i.g. The final sample indicated 27.6% solids or 98.0% conversion. The polymer slurry was then discharged from the autoclave and was a fluid white latex.

The copolymer isolation was carried out in a 30-gallon stainless steel drum 18" dia. x 31" high and equipped with a turbine, 8" dia., with 6 blades and spinning at 100 r.p.m. A steam coil in the drum is provided for heating.

Into the drum was charged 10 gallons of distilled water and to this was added 1480 grams potassium chloride and the mixture agitated until the salt dissolved. 7400 cc. of copolymer latex (from above copolymerization) was then added to the KCl solution to coagulate the copolymer. The batch was agitated 15 minutes; then the coagulated copolymer from the drum was removed as a solid by filtration. The copolymer cake was then returned to the drum and slurried with 20 gallons of distilled water. This mixture was then heated to 70° C. and while heating, 12 cc. of 50% NaOH was added to raise the pH to about 7.5–8.0. At 70° C. the batch was again filtered and the final cake washed with methanol. If facilities are available for removing water, the methanol wash is not necessary.

The cake resulting from the filtration was then ground in a Wiley mill with a coarse screen to help the drying. Drying was done in a vacuum oven at 40° C. for about 24–48 hours to attain constant weight. Percent recovery of polymer was 94.2 in this run.

This copolymer contained 75% PVC by elemental analysis, and a 1.0 w./v. percent toluene solution had an $\eta_{rel}$ of 1.37. A sample melted at 90–100° C., and a 10 mil Carver pressed film had a tensile strength of 3,200 p.s.i.g. and 4.5% elongation.

EXAMPLE III

This example is a tabulation (Table I) of several copolymerizations which were carried out by the general procedure of Example I at about 29% solids. This tabulation shows (1) the reproducibility of the copolymerization, (2) the improved yield of isolated copolymer when using KCl as coagulant vs. aluminum sulfate, and (3) that the degree of conversion of increment 1 (Phase B) is the controlling factor in the ultimate tensile strength of the copolymer.

It will be noted that the polyvinyl chloride content of the copolymer approaches the ideal 70% only at initial conversions on increment (1) of 65%. It will also be noted that the tensile strength of the copolymer is 3000 p.s.i.g. only when increment (1) is ca. 40–50% converted to copolymer.

It will be further noted that the overall reaction is highly reproducible as shown by the final conversion, and copolymer $\eta_{rel}$ columns specifically.

The tabulation also shows the improved yields of copolymer from coagulation by using KCl as coagulant rather than aluminum sulfate as has been taught in the prior art. The reason for this is that $Al_2(SO_4)_3$ reacts with sodium alkyl sulfate to produce aluminum alkyl sulfate which precipitates with the copolymer and can only be removed by washing with hot NaOH solution at which point a great part of the polymer is re-emulsified. With KCl, potassium alkyl sulfate is formed, which can be removed from the copolymer by washing with warm (50–80° C.) water without copolymer re-emulsification, the potassium alkyl sulfate being apparently not a very good emulsifying agent.

(1.0 w./v. percent in toluene), a melting range of 96–105° C., and a tensile strength of 2330 p.s.i.g., with an elongation of 4.0%. Thus while a good tensile strength was obtained, the copolymer did not contain the desired amount of isobutyl vinyl ether.

EXAMPLE V

This example illustrates the copolymerization of isobutyl vinyl ether and vinyl chloride at 30° C. and at 40% solids.

An aqueous phase consisting of 300 grams of distilled water, 12 grams of sodium lauryl sulfate of 99.5% assay, 4 grams of $Na_2HPO_4$ and 1.5 ml. of 50% sodium hydroxide solution was prepared and had a pH of 12.0. To this was added 0.2 gram of potassium persulfate and the whole heated to 65–70° C. while stirring and held at this temperature for 1½ hours with a few $N_2$ bubbles trickling through. At the end of this time the solution was cooled to room temperature, and 0.9 gram of potassium persulfate added. The aqueous phase was then reacted with a mixture of 60 grams of isobutyl vinyl ether and 60 grams of vinyl chloride for 4¾ hours at 30° C. as in Example I. The final portion of vinyl chloride, 80 grams, was then added to the reaction mixture in 4 equal increments over an eight-hour period allowing 2 hours for each increment to react before addition of the succeeding increment. After all the vinyl chloride had been added, the reaction was continued for fifteen hours when a pressure of 1 p.s.i.g. was reached. The product was a blue-white latex of low viscosity, pH 11.1, and containing 41.2% solids (42.1% theoretical).

The latex was coagulated in methanol and the polymer therefrom purified by washing with water. After drying to constant weight, the product was analyzed and found to be composed of 47.6% C; 6.90% H; 41.42% Cl corresponding to 27% isobutyl vinyl ether and 73% polyvinyl chloride. The copolymer had an $\eta_{rel}$ value of 1.50 as measured on a Manheim M. P. block, and could be Carver pressed into 10 mil films which showed a tensile strength of 5,700 p.s.i.g. and an elongation of 6.2%.

EXAMPLE VI

An aqueous phase of the same composition was pre-

TABLE I

| Exp. No. | Latex pH | Latex, percent solids | Final conversion | Copolymer, percent Cl | Copolymer, percent PVC | Copolymer $\eta_{rel}$ (1.0 toluene) | Copolymer, percent elongation | Copolymer, tensile | Percent conversion for increment 1 | 2 | 3 | 4 | 5 | Coagulant | Percent copolymer yield from coagulation |
|---|---|---|---|---|---|---|---|---|---|---|---|---|---|---|---|
| a | 7.0 | 28.0 | 96.5 | 41.8 | 73.2 | 1.36 | 4.2 | 3,300 | | | | | | MeOH | |
| b | 7.0 | 27.7 | 95.5 | 41.3 | 72.5 | 1.37 | 4.6 | 2,940 | | | | | | MeOH | |
| c | 6.9 | 26.6 | 91.5 | 40.6 | 71.3 | 1.29 | 1.7 | 2,500 | | | | | | MeOH | |
| d | | 28.4 | 98.0 | 38.6 | 69.0 | 1.39 | | | 67.5 | 83.1 | 83.5 | 91.5 | | MeOH | |
| e | 6.8 | | | 41.3 | 72.5 | 1.34 | 4.3 | 2,640 | 62.5 | 87.8 | 98.0 | 94.7 | 93.6 | $Al_2(SO_4)_3$ | |
| f | | | 98.6 | 41.0 | 72.0 | 1.35 | 3.4 | 2,370 | 73.1 | 83.4 | 92.4 | 96.2 | 98.6 | $Al_2(SO_4)_3$ | 46.5 |
| g | 6.6 | | | 40.5 | 71.0 | 1.32 | 3.4 | 2,080 | 79.0 | | | | | $Al_2(SO_4)_3$ | 35.0 |
| h | 6.7 | | 98.0 | 42.1 | 74.0 | 1.37 | 4.3 | 2,900 | 78.0 | | | | | $Al_2(SO_4)_3$ | 28.6 |
| i | 6.7 | | 95.2 | 41.9 | 73.6 | 1.36 | 3.5 | 3,050 | 38.4 | | | | | $Al_2(SO_4)_3$ | 47.8 |
| j | 6.8 | | 93.0 | 43.3 | 76.5 | 1.39 | 4.6 | 3,080 | 48.0 | 71.2 | 80.0 | 86.5 | 92.3 | KCl | 87.8 |
| k | 6.8 | | 97.5 | 42.85 | 75.2 | 1.37 | 4.5 | 3,020 | 40.3 | 63.1 | 40.6 | 90.1 | 95.6 | KCl | 94.2 |
| l | 6.8 | | | 43.20 | 76.4 | 1.35 | 3.9 | 2,640 | 45.1 | 74.0 | 88.2 | 95.5 | 95.7 | KCl | 95.5 |

EXAMPLE IV (COMPARATIVE)

This example shows the adverse effect on the copolymerization and the copolymer properties when a surfactant of purity less than 95% assay is employed.

In this example the procedure of Example III was followed with the exception that 99.5% assay sodium lauryl sulfate was replaced by the same amount of sodium lauryl surfate of 93% purity.

The reaction of increment 1 was very poor, no pressure drops being noted. Also, no pressure drops were noted during the time allowed for increments 2, 3, 4 and 5. Only after all monomers were charged and a total of nine hours had elapsed did pressure drops commence. The final pressure was only 7 p.s.i.g. The final latex contained 26.4% solids (90.5% conversion). The isolated copolymer contained 77% polyvinyl chloride by elemental analysis instead of the desired 70–72%, had an $\eta_{rel}$ of 1.4 pared in the same manner as in Example V with the exception that 2.0 grams of potassium persulfate were added instead of 1.1 gram. The pH of the solution was 12.0.

The aqueous phase was reacted at 30° C. in the same manner as in Example V with a mixture of 90 grams of isobutyl vinyl ether and 90 grams of vinyl chloride for 4¾ hours. There was then added in increments as in Example I a total of 120 grams of vinyl chloride and reaction allowed to proceed to 0 p.s.i.g. which required 13 hours. The product was a blue-white latex of low viscosity which had a pH of 8.7, and contained 51.2% solids (51.4% theoretical).

A sample of copolymer isolated and purified as in Example I had the following characteristics:

Percent C, H, Cl: 47.45; 6.67; 43.06 indicating 75% polyvinyl chloride by carbon content.

$\eta_{rel}$ 1.438 as measured in a 1.0 w./v. percent solution in toluene

Softening point (Manheim Block) 90–100° C.
Tensile strength of 10 mil Carver pressed film 3,210 p.s.i.g. and an elongation of 4.9%.

EXAMPLE VII

The copolymerization of Example I was repeated in its entirety with the exception that the autoclave was run at 40.0° C.

The results were very similar with the exception that slightly more pre-coagulation occurred during synthesis so that a latex (pH 10.1) of only 49.5% solids (51.4% theoretical) was obtained.

I claim:

1. The process of preparing copolymers of isobutyl vinyl ether and vinyl chloride which comprises copolymerizing to about 91 to 99% conversion in a pressure vessel, about 24 to 31 parts by weight of isobutyl vinyl ether and incrementally adding thereto about 76 to 69 parts by weight of vinyl chloride in an aqueous phase containing potassium persulfate as catalyst and about 3.5 to 4.5% based on the weight of the aqueous phase of sodium alkyl sulfate of at least about 95% assay as surfactant, in which the alkyl group contains from 8 to 16 carbon atoms, at a temperature of about 30°–40° C. for a period of time until a constant pressure value of about 0 to 4 p.s.i.g. is obtained in said pressure vessel, and then isolating the said copolymer from the reaction medium.

2. The process according to claim 1 wherein the sodium alkyl sulfate is sodium lauryl sulfate.

3. The process according to claim 1 wherein the said copolymer is isolated from the reaction medium by coagulation with a primary aliphatic alcohol of from 1 to 4 carbon atoms.

4. The process according to claim 1 wherein the said copolymer is isolated from the reaction medium by coagulation with a water soluble salt of a potassium cation.

5. The process according to claim 1 wherein the sodium alkyl sulfate is sodium lauryl sulfate of 99.5% assay.

6. A process as defined in claim 1 wherein there is employed about 30 parts by weight of isobutyl vinyl ether and about 70 parts by weight of vinyl chloride.

7. A process as defined in claim 6 wherein said 30 parts of isobutyl vinyl ether are first polymerized with about 30 parts of the vinyl chloride for a period of time to yield a conversion of 40–50%, followed by addition of about 40 parts of the vinyl chloride to the reaction medium in 4 equal increments.

References Cited

UNITED STATES PATENTS 2,016,490  10/1935  Fikentscher _____ 260—87.5 G

OTHER REFERENCES

Schildknecht: Vinyl and Related Polymers, John Wiley & Sons, Inc. N.Y. (1952), p. 408 and 409.

Chemical Abstract vol. 50, No. 604g (1956).

Shostakouskii et al.: Copolymerization of Vinyl Butyl Ether and Vinyl Chloride.

Bankoff et al.: A Vinyl Chloride Polymerization Procedure in Ind. and Eng. Chemistry, vol. 45, No. 2, 1953, p. 270.

Williams L.: Polymerization in Emulsion in Polymer Processes Ed., Schildknecht, pp. 137 and 138, 1956.

JOSEPH L. SCHOFER, Primary Examiner

S. H. LEVIN, Assistant Examiner